United States Patent [19]
George

[11] Patent Number: 5,832,478
[45] Date of Patent: Nov. 3, 1998

[54] METHOD OF SEARCHING AN ON-LINE DICTIONARY USING SYLLABLES AND SYLLABLE COUNT

[75] Inventor: John L. George, Laurel, Md.

[73] Assignee: The United States of America as represented by the National Security Agency, Washington, D.C.

[21] Appl. No.: 815,670

[22] Filed: Mar. 13, 1997

[51] Int. Cl.$^6$ .................................................. G06F 17/30
[52] U.S. Cl. ..................... 707/3; 707/5; 707/6; 382/225; 704/7; 704/8
[58] Field of Search .................................. 707/3, 4, 5, 6, 707/10; 382/229, 230; 704/7, 8, 9

[56] References Cited

U.S. PATENT DOCUMENTS

| | | | |
|---|---|---|---|
| 4,438,505 | 3/1984 | Yanagiuchi et al. | 704/7 |
| 5,148,541 | 9/1992 | Lee et al. | 395/600 |
| 5,519,857 | 5/1996 | Kato et al. | 395/600 |
| 5,544,049 | 8/1996 | Henderson et al. | 364/419.19 |
| 5,675,788 | 10/1997 | Husick et al. | 395/615 |
| 5,724,593 | 3/1998 | Hargrave, III et al. | 395/757 |
| 5,734,749 | 3/1998 | Yamada et al. | 382/187 |
| 5,737,734 | 4/1998 | Schultz | 707/5 |

OTHER PUBLICATIONS

Chang et al. "Isolated Mandarin Syllable Recognition Using Segmental Features" IEE Proc.–Vis. Image Signal Process, vol. 142, No. 1, Feb. 1995, pp. 59–64.

Poo "A two–Level TDNN (TLTDNN) Technique for Large Vocabulary Mandarin FINAL Recognition" IEEE, 1994, pp. 4396–4399.

Hon et al. "Towards Large Vocabulary Mandarin Chinese Speech Recognition" IEEE, 1994, pp. 545–548.

Ching et al. "From Phonology and Acoustic Properties to Automatic Recognition of Cantonese" 1994 International Symposium on Speech, Image Processing and Neural Networks, Apr. 1994, Hong Kong, pp. 127–132.

Lee et al. "Golden Mandarin(II) —An Improved Single–Chip Real–Time Mandarin Dictation Machine for Chinese Language with Very Large Vocabulary" IEEE, 1993, pp. 503–506.

Lin et al. "A New Framework for Recognition of Mandarin Syllables with Tones Using Sub–syllabic Units" IEEE, 1994, pp. 227–230.

Chen "A First Study on Neural Net Based Generation of Prosodic and Spectral Information for Mandarin Text–to–Speech" IEEE, 1992, pp. 45–48.

*Primary Examiner*—Thomas G. Black
*Assistant Examiner*—Michael J. Wallace, Jr.
*Attorney, Agent, or Firm*—Robert D. Morelli

[57] ABSTRACT

The present invention is a method of searching an on-line dictionary in any language representation using syllables and syllable count and an on-line dictionary, where the on-line dictionary includes a primary headword field, a segmented primary headword field, additional unsegmented language representation (headword) fields as required, additional segmented representation (headword) fields as required, a syllable count field, additional syllable count fields as required, and a definition field. The user selects a language representation for a query and makes the query in the selected language representation. The present invention then parses the query to determine if segmented syllables were used in the query and how many, if any. If no segmented syllables were used in the query, a character string search for the headword that matches the query is conducted. If the query contains segmented syllables, a syllable search for headwords that contain the same syllables in the same locations is conducted. The present invention returns one or more headwords in the language of the query and their corresponding definitions in the language of the user. Various wildcard symbols may be used for unknown syllables and for characters within a syllable, which may include tones.

9 Claims, 2 Drawing Sheets

| TABLE FOR EACH ON-LINE DICTIONARY ENTRY |
|---|
| Headword Field |
| Segmented Headword Field |
| Unsegmented Language Representation Fields, if any |
| Segmented Language Representation Fields, if any |
| Syllable Count Field |
| Language Representation Count Fields, if any |
| Definition Field |

FIG. 2

| EXAMPLE OF AN ON-LINE DICTIONARY ENTRY |
|---|
| BEIJINGZHILIREN |
| BEI JING ZHI LI REN |
| BEI3JING1ZHI2LI4REN2 |
| BEI3 JING1 ZHI2 LI4 REN2 |
| 5 |
| Peking Man |

FIG. 3

METHOD OF SEARCHING AN ON-LINE DICTIONARY USING SYLLABLES AND SYLLABLE COUNT

FIELD OF THE INVENTION

The present invention relates to data processing and, more particularly, to a method of searching an on-line dictionary using syllables and syllable count.

BACKGROUND OF THE INVENTION

The field of text searches includes the activity of searching an on-line dictionary for a particular word. Such a search is useful to a student learning a foreign language. Each dictionary term consists of two, or more, components or fields. At a minimum, each term includes a headword and a definition, but other fields are possible (e.g., part-of-speech, source). A language (e.g., Chinese) may have multiple ways of representing terms (e.g., simplified Chinese ideographs, traditional Chinese ideographs, Pinyin romanization [commonly referred to as just Pinyin], Pinyin and Tone [Pinyin with something to indicate the various tones used by the Chinese to convey meaning], etc.).

Pinyin romanization is a textual representation created by the Chinese government that uses twenty-five letters of the English alphabet to represent the sound of a particular Chinese term (e.g., SANLUNQICHE). In printed material, standard Pinyin also uses four diacritic marks to represent the four tones which convey meaning in Mandarin Chinese. A neutral tone is generally indicated by the lack of a diacritic mark. An English-speaking student studying Chinese could learn to pronounce Chinese words through the use of the Pinyin terms, which convey the sounds of Chinese words in the same way that English, French, or German spelling conveys the sounds of those languages. Computer programs, particularly programs developed for Western language students, frequently drop the diacritic marks. This practice is discussed in more detail below. In the present invention, standard Pinyin refers to the official representation created by the Chinese Government. The term Pinyin by itself refers to the alternate representation method used in computer programs which drops the diacritic marks.

Another representation of Chinese referred to as "Pinyin and Tone" uses the same twenty-five letters as Pinyin but adds numbers or other symbols in place of the four diacritic marks to phonetically represent Mandarin Chinese, the official national language of China. Pinyin and Tone is a convention developed for use in computer programs, particularly those programs developed for Western language students, in order to overcome the limitations of the computer systems and represent all of the sounds found in standard Pinyin. In contrast to the alternate Pinyin method described in the previous paragraph, Pinyin and Tone can fully represent the sounds of spoken Mandrin. For the purposes of describing the present invention, the numerals one through five will be used to represent the four Mandarin tones and the neutral tone, respectively.

Pinyin orthography provides strict rules for spelling a single syllable word (e.g., "JIAO1" and "YANG2"). Because of a large number of homophones in Chinese, each Pinyin syllable will, generally, map to more than one ideograph. The orthographic rules are not as well determined for polysyllabic words and phrases. Because Chinese words are generally polysyllabic, a variety of orthographic styles have emerged.

Chinese publications follow style guides, but the spelling standards are by no means universally consistent. Pinyin romanization of discrete polysyllabic words will, generally, be written without a space between the syllables. For example, "FEN1JIE4XIAN4" (meaning boundary). In the case of phrases and traditional four-character sayings (CHENGYU), the conventions generally call for spaces or dashes between words. For example, "FENG1PING2-LANG4JING4" (meaning calm and tranquil) or "SAN1LUN4 QI4CHE1" (meaning three-wheeled automobile).

Developers of Chinese on-line dictionaries have, frequently, modified Pinyin usage to overcome the technical limitations of computer systems. For example, the standard English keyboard and the American Standard Code for Information Interchange (ASCII) do not support the input, storage, and display of the diacritic marks. To overcome this limitation, diacritic marks are either dropped, or another method is employed, such as using numerals to indicate tone.

A second problem involves the use of spaces between phrases. The use of spaces requires that terms be stored in accordance with a strict style guide. In order to conduct an accurate search of the dictionary, users would have to be thoroughly familiar with the conventions of the style guide. A small mistake in following the conventions of the style guide would lead to a failed search. For example, a search against "SANLUNQICHE" would fail to find "SANLUN QICHE."

To solve these problems, developers of Chinese on-line dictionaries have adapted a number of modified Pinyin styles. The reason that a number of dictionaries provide a field for Pinyin without tone markers is that many language students may not know the correct tones of a word in question. A database that does not include tone markers allows a user to search for the romanized word without regard to the tonal pattern. If only a Pinyin and Tone field were present, a user would have to add wildcard characters (characters that represent one or more unspecified letters or numerals) to the search, which would slow down the search and return many more terms than the user wishes to see.

The modified Pinyin style for Pinyin fields described above enhances the search capability for Chinese on-line dictionaries, but creates other problems. In particular, the use of this format creates a serious problem with a wildcard search. In a wildcard search, the user may substitute a special character to represent from zero to many letters and numerals in a character string. In standard conventions, the special character "?" represents a single letter or numeral, while the special character "*" represents zero to many letters and numerals. For example, the entry "J*" would return the following Pinyin representations from an on-line dictionary of single syllable words: JI, JIA, JIAN, JIANG, JIAO, JIE, JIN, JING, JIONG, JIU, JU, JUAN, JUE, and JUN. Moreover, each Pinyin syllable would map to many characters. For example, the Pinyin syllable "JI" maps to well over one-hundred distinct Chinese ideographs. Thus, while Chinese ideographs are distinct and unambiguous, spoken Chinese is not. Spoken Chinese has a large number of homophones. For example, Mandarin Chinese has four-hundred six distinct monosyllabic sounds when tones are disregarded. When tones, which are integral to the meaning of a word, are considered, the number of distinct monosyllabic sounds increases to about one-thousand five-hundred. As a phonetic representation, Pinyin romanization mirrors the ambiguity and redundancy of the spoken language and maps poorly to the terms stored in the computer, since the dictionary terms are distinguished and categorized on the basis of the Chinese ideograph headwords. Thus, there is, generally, a one to many mapping between a Pinyin string and related terms stored in the dictionary. For example, a search on the Pinyin string "BEIJING," without tone numerals, would yield at least three results in a typical dictionary: "BEI3JING1 (meaning the city Beijing), "BEI4JING3" (meaning background); and "BEI4JING4" (meaning quiet and secluded).

A similar wildcard search in a typical Chinese-English on-line dictionary could, and frequently does, yield many thousands of terms. This is because most such dictionaries contain polysyllabic words and phrases and because there is greater redundancy and ambiguity in the character string patterns of Romanized Chinese than there is in most other languages due to the homophonic nature of the language. For example, a search against "BEI*" would find every term in the dictionary that began with the letters "BEI." In practice, the list of dictionary entries resulting from a wildcard search against Pinyin headwords is frequently so large and contains so many non-relevant terms that it becomes impractical for the user to review the resulting list. For example, the search "BEI*" yielded three-thousand four-hundred seventeen terms for one particular on-line dictionary.

The present invention proposes a method of doing text searches, particularly on-line dictionary searches, for only the most relevant entries that a person studying a foreign language may be interested.

U.S. Pat. No. 4,438,505, entitled "ELECTRONIC DICTIONARY AND LANGUAGE INTERPRETER WITH AUTO-SEARCH KEY FOR DERIVING A FULL-LENGTH WORD AND ITS ASSOCIATED TRANSLATION WORD BASED ON A PARTIAL WORD ENTERED," discloses a method of text searching that involves providing a partial word and receiving every word, in that language and the foreign language of interest, that contains the partial word. The method of U.S. Pat. No. 4,438,505 would return many words that are not relevant to the user and may return so many words that the user would find the result useless. The present invention discloses a method that would return only those words that are most relevant to the user. U.S. Pat. No. 4,438,505 is hereby incorporated by reference into the specification of the present invention.

SUMMARY OF THE INVENTION

It is an object of the present invention to improve the effectiveness of text searches.

It is another object of the present invention to improve the effectiveness of text searches of on-line dictionaries.

It is another object of the present invention to improve the effectiveness of text searches of an on-line dictionary by specifying the known syllables and their locations in the word sought, specifying the total number of syllables in the word sought, and putting a wildcard mark in the locations of any unknown character(s) or unknown syllable(s).

The objects of the present invention are achieved by a method of improving the effectiveness of wildcard searches of on-line dictionaries by having the user provide all known syllables of the word, or words, the user wishes to retrieve (in the language of the on-line dictionary), the location of all known syllables, and a wildcard mark in the location of all unknown characters and syllables. The present invention is applicable to any language.

The user selects a language representation for a query (e.g., Pinyin). The table for each entry in the on-line dictionary includes at least a primary headword field (representation), a primary segmented headword field (representation), zero or more unsegmented language representation fields (secondary headwords), zero or more segmented language representation fields (segmented secondary headwords), a syllable count field, additional syllable count fields if any additional segmented language representation fields differ in syllable count from the syllable count field, and a definition field. A user may request a character string search or a syllable search based on the format of the query. Segmentation marks between syllables are used in the query to request a syllable search. If no segmentation marks are included in the query, a character string search will be conducted. The user selects a language representation for the query. Next, the user presents a query. Next, a parser parses the query to see if there are any segmentation marks in the query. If a query includes a segmentation mark, a syllable search is conducted. If no segmentation mark is included in the query, a character string search is conducted.

BRIEF DESCRIPTION OF THE DRAWINGS

FIG. 2 is a representative table of each entry in an on-line dictionary searchable by the present invention; and FIG. 3 is an example of a dictionary entry.

DETAILED DESCRIPTION

Figure 1:
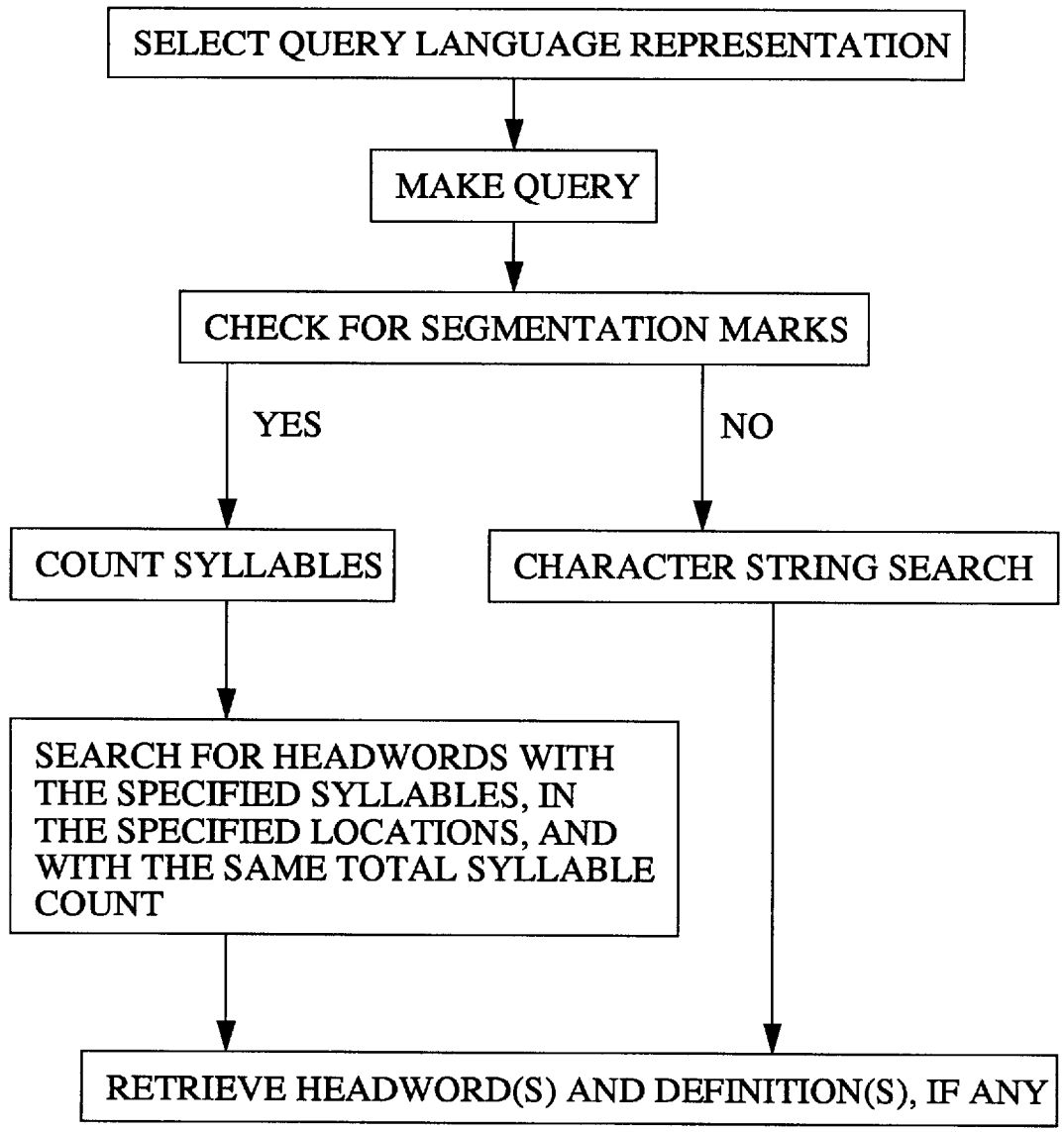
FIG. 1 is a flow chart of the present invention.

The present invention is a method of improving the effectiveness of on-line dictionary searches by specifying the known syllables and their locations in the word sought, specifying the total number of syllables in the word sought, and putting a wildcard mark in the locations of the unknown syllables or unknown characters of a partially known syllable. The present invention is not limited to any language or any language representation.

FIG. 1 is a flow chart of the present invention. FIG. 2 is a table that represents one possible way to store information for each entry in an on-line foreign language dictionary employed in the present invention.

In the first step of FIG. 1, the user selects a query type. The possible query types are any language representation (e.g., English alphabet, English ASCII, Chinese Pinyin, Chinese Pinyin and Tone, etc.) that are available in the on-line dictionary.

FIG. 2 illustrates a table that might exist for each entry of the on-line dictionary. The table includes at least a headword field, a segmented headword field, zero or more unsegmented language representation fields, zero or more segmented language representation fields, a syllable count field, additional syllable count fields if any additional segmented language representation field differed in syllable count from the syllable count field, and a definition field. More fields are possible depending on the nature of the on-line dictionary and the options that a user may want.

In FIG. 2, the headword field of each entry in the on-line dictionary indicates the stored word, where the word is not broken down into syllables. Headwords allow the user to do a character string search for the exact word if the desired headword is known to the user. The on-line dictionary may store words in more than one language. The on-line dictionary will store the headword in the most popular language representation of the language in question (e.g., Chinese Pinyin). A wildcard character is available in the present invention to represent one or more characters. For example, the symbol "*" may be used to represent one or more characters.

A user may search for an exact character string by presenting a query that does not include a segmentation mark or a wildcard symbol. The user may also request a character string search that includes a wildcard character. This option is only provided for completeness, because character string searches with wildcard characters may return so many irrelevant words that the original purpose of the search is obscured. The contribution of the present invention to the art of text searches is a method of doing wildcard-type searches that returns only the most relevant words.

In FIG. 2, the segmented headword field of each entry contains the headword of the corresponding entry segmented into syllables. A "space" character is used to segment the syllables from each other. Any other suitable character may be used. The segmented word is in the same language representation as the headword. Having the headwords segmented into syllables allows for searches based on syllables. As will be described below in more detail, a search for every headword that contains certain syllables may be done. By doing this, searches are done more quickly and return only the most relevant words desired by the user.

There may be zero or more unsegmented language representation fields. That is, a particular language may have more than one language representation (e.g., Chinese Pinyin, Chinese Pinyin and Tone, etc.). The most popular language representation is used in the headword field (e.g., Chinese Pinyin). Therefore, additional fields are provided in the on-line dictionary to store these additional unsegmented language representations of the headword so that a user may do a character string search on any language representation of the headword. As the name suggests, the zero or more unsegmented language representation fields are not broken down into syllables and may be searched on a character string basis as described above for the unsegmented headword field.

There are also zero or more segmented language representation fields. That is, for each unsegmented language representation, there is a corresponding segmented language representation field that contains the unsegmented language representation segmented into syllables. Again, the "space" character is used to segment the syllables, but any suitable character will do. Having these segmented fields for each language representation allows a user to do a syllable based search for a headword in any language representation.

There is also a syllable count field. The syllable count field for each on-line dictionary entry contains the number of syllables listed in the corresponding segmented headword field. If the number of syllables contained in a segmented language representation field differs from the syllable count of the corresponding headword then an additional syllable count field would be included for each segmented language representation field. Each additional syllable count field would contain the syllable count for the corresponding segmented language representation field. As will become more clear in an example that follows, the syllable count field allows a user to specify the total number of syllables in a query so that only those words that have the exact number of syllables is retrieved. This feature reduces the amount of irrelevant words retrieved while still affording the users the luxury to be imprecise in their query.

The last field in the on-line dictionary is a definition field for each entry. The definition field contains the definition of the foreign word retrieved. The definition is written in the native language of the user. That is, the headword and segmented headwords are in the language the user is trying to learn while the definition is in a language the user already knows.

FIG. 3 is an example of an on-line dictionary entry using the format of FIG. 2. The headword field contains the unsegmented Chinese Pinyin word "BEIJINGZHILIREN." The segmented headword field contains this word broken down into syllables, where a "space" character is used to separate the syllables (i.e., BEI JING ZHI LI REN). Here, only one additional unsegmented language representation field is shown (i.e., Pinyin and Tone "BEI3JING1ZHI2LI4REN2"). Pinyin and Tone includes five numerals which convey additional meaning. There are numerous other Chinese language representations that may be included. The corresponding segmented language representation field contains "BEI3 JING1 ZHI2 LI4 REN2," where the tone numeral is attached to the end of the syllable for which it applies. Since the number of syllables is the same for both language representations, there is only one syllable count field, and it contains the number five. Assuming that the user already speaks English, the definition field contains the definition of the word above (i.e., Peking Man). If the user spoke a different language then the definition would be returned in that language. The on-line dictionary would have to be pre-set for the native language of the user and the language that the user wished to learn.

Because Pinyin and Tone representations are commonly implemented in the segmented format, it is possible to eliminate the requirement for the unsegmented Pinyin and Tone field in the example on-line dictionary. Users of the on-line dictionary would be familiar with this convention and would not expect to make character string searches against the Pinyin and Tone field. Further, the unsegmented Pinyin field and the unsegmented Pinyin and Tone field have very similar character string patterns. This fact allows the segmented Pinyin and Tone field to be used for the syllable search in place of the segmented Pinyin field. This alternate method requires a modification of the query statement to account for the differences in the two fields. These changes result in the elimination of the need for two fields and a substantial reduction in data storage requirements while allowing the present invention to conform more closely to the conventions of the specific language. The present invention allows similar modifications wherever the conventions of a specific language representation permit or encourage such modifications.

The next step in the flow chart of FIG. 1 is for the user to select a language representation for the query (e.g., Chinese Pinyin). As mentioned above, the language representation selected determines which fields will be searched (i.e., the headword and, possibly, its associated segmented field or an additional language representation field and, possibly, its associated segmented field).

Next, the user presents a query. Typically, the query is a word. The present invention is applicable to phrase dictionaries and any other multi-word on-line references. The query must be in the language representation selected by the user. Typically, the user is a person trying to learn a foreign language. The user may wish to know the definition of a particular foreign word or all relevant foreign words with a particular series of letters or a number of syllables, where some syllables may be known and others may not. That is, if the user wishes to do a character string search for a word the user wishes to know the definition of, the user types the entire word as the query without any additional characters. If the user wishes to do a character string search for any headword beginning or ending with a certain letter combination then a wildcard character (e.g., "*") may be added in the appropriate location. For example, "BEI*", "*LI*", and so on. If the user wishes to search for words having a fixed number of syllables, where some syllables are known and other are not, then the user types the syllables, segmented by the "space" character, where any unknown syllable is indicated by the wildcard symbol (e.g., "*") enclosed by segmentation marks (e.g., the "space" symbol). For example, "BEI * * LI *." The wildcard character may also be used in conjunction with the syllable search when one or more characters of a syllable are known (e.g., "BEI J* * LI *). When the wildcard is used in conjunction with the syllable pattern defined by the segmentation marks, the user avoids the problem of receiving too many irrelevant words as one would using the wildcard approach of the prior art. A wildcard may represent an unknown syllable or part of a syllable which is unknown. The more information which is known about a syllable, the more precise the search.

Next, a parser parses the query to see if there are any segmentation marks in the query. The presence of a segmentation mark indicates that the user does not wish to do a character string search but wishes to retrieve words having a fixed number of syllables. A segmentation mark (e.g., a "space" character or any other suitable symbol) is used by the user to segment the query by syllable. The user need only specify the syllables known to the user. A wildcard symbol "*" enclosed by segmentation marks may be used to indicate the unknown syllables, but the user must know the location of the known and unknown syllables. The "unknown syllable" symbol (i.e., the wildcard symbol enclosed by segmentation marks) represents any syllable of character length one or more. That is, only those headwords having the known syllables in the exact locations as indicated in the query will be retrieved. The "unknown syllable" symbol is useful for helping to establish the total number of syllables in the query (e.g., "BEI * * LI *" is a five syllable query, where the first and fourth syllables are known and the second, third, and fifth syllables are unknown). Only those headwords having the exact number of syllables as the query will be retrieved (e.g., five syllables). These two limitations are additive. That is, only those headwords having the exact number of syllables with the known syllables being in the locations as indicated by the query will be retrieved (e.g., five syllable headwords having the first syllable "BEI" and the fourth syllable "LI").

If a query includes a segmentation mark, a syllable search is conducted using the segmented field corresponding to the language representation selected by the user. If no segmentation mark is included in the query, a character string search is conducted using the headword field or the unsegmented language representation field corresponding to the language representation selected by the user.

A syllable search query contains two essential elements, a character string pattern which defines the locations of the known and the unknown syllables, and the total syllable count that includes the known and the unknown syllables. These two elements are joined by the boolean "AND" operator and compared against the segmented field that matches the language representation selected by the user and the appropriate syllable count field.

For example, a Pinyin query "BEI*" using the typical method of the prior art would return thirty-four hundred seventeen words. Another prior art query of "BEI*LI*" would return two-hundred sixty-six words. A query "BEI * * LI *" of the present invention returns one five syllable word having "BEI" as the first syllable and "LI" as the fourth syllable. A search using the present invention is more discriminating than the prior art method and may return a smaller, and more accurate, list of headwords to the user. Because the query string and the stored data are segmented by syllables, a more precise pattern match is possible. Also, the method allows the user to delimit the search by the number of syllables in the query.

In the preferred embodiment for Chinese language representations described above, Pinyin and Tone would be available as a syllable search option using a segmented Pinyin and Tone field. In Pinyin and Tone syllable searches, the symbol representing the tone may be thought of as simply another character and the user may make intuitive searches using the same conventions used for other types of syllable searches. That is, the user may replace unknown tones with the appropriate wildcard symbol. It is possible to implement Pinyin and Tone for both character string searches and syllable searches if locally accepted language representation conventions prefer this approach. When implementing Pinyin syllable searches utilizing a segmented Pinyin and Tone field, the user enters queries in the same format that would be used against a segmented Pinyin field. The user query is modified in the background to run against the Pinyin and Tone field without further intervention by the user. Because of this capability, computer efficiency may be increased by not requiring a segmented Pinyin field.

What is claimed is:

1. A method of searching an on-line dictionary using syllables and syllable count; comprising the steps of:

a) having an on-line dictionary, where the on-line dictionary includes for each entry in the on-line dictionary a headword field, a segmented headword field, a syllable count field, and a definition field;

b) selecting, by the user, a language representation for a query;

c) making the query in the selected language representation;

d) determining if the query is segmented into syllables;

e) searching each headword field in the on-line dictionary for headwords that match the character string of the query if the query is not segmented into syllables;

f) determining the number of syllables in the query;

g) searching each segmented headword field in the on-line dictionary for headwords that contain the same syllables in the same locations as in the query and the same number of syllables as in the syllable count field if the query is segmented into syllables;

h) returning the headword, in the language representation of the query, and the definition of the headword, in the language of the user, that matches the query if the query did not contain segmented syllables; and i) returning the headwords, in the language representation of the query, and the definitions of the headwords, in the language of the user, that match the query with respect to syllable, syllable location, and syllable count if the query is segmented into syllables.

2. The method of claim 1, wherein said step of having an on-line dictionary is further comprised of the step of having an on-line dictionary in any language and language representation.

3. The method of claim 1, wherein said step of making a query in the selected language representation is further comprised of the step of making a query in the selected language representation in the form of a character string, where a wildcard symbol may be used to represent at least one character in the query.

4. The method of claim 1, wherein said step of making a query in the selected language representation is further comprised of the step of making a query in the selected language representation that is segmented into syllables, where a symbol may be used to represent an unknown syllables in the query and at least one character in a partially known syllable.

5. The method of claim 2, wherein said step of making a query in the selected language representation is further comprised of the step of making a query in the selected language representation in the form of a character string, where a wildcard symbol may be used to represent at least one character in the query.

6. The method of claim 5, wherein said step of making a query in the selected language representation is further comprised of the step of making a query in the selected language representation that is segmented into syllables, where a symbol may be used to represent an unknown syllable in the query and at least one character in a partially known syllable.

7. The method of claim 1, wherein said step of having an on-line-dictionary is comprised of the step of having an on-line dictionary, where the on-line dictionary includes for each entry in the on-line dictionary a headword field, a segmented headword field, at least one unsegmented language representation field, at least one segmented language representation field, a syllable count field, at least one language representation syllable count field, and a definition field.

8. The method of claim 7, wherein said step of searching each headword field is comprised of searching each headword field and the at least one unsegmented language representation field in the on-line dictionary for headwords that match the character string of the query if the query is not segmented into syllables.

9. The method of claim 8, wherein said step of searching each segmented headword field is comprised of the step of searching each segmented headword field and the at least one segmented representation field in the on-line dictionary for headwords that contain the same syllables in the same locations as in the query and the same number of syllables as in the syllable count field and the at least one language representation syllable count field if the query is segmented into syllables.

* * * * *